(12) United States Patent
Remis et al.

(10) Patent No.: US 10,528,516 B2
(45) Date of Patent: Jan. 7, 2020

(54) SELECTION OF A LOCATION FOR INSTALLATION OF A HARDWARE COMPONENT IN A COMPUTE NODE USING HISTORICAL PERFORMANCE SCORES

(71) Applicant: Lenovo Enterprise Solutions (Singapore) Pte. Ltd., Singapore (SG)

(72) Inventors: Luke David Remis, Raleigh, CA (US); Milton Cobo, Raleigh, NC (US); Matthew Nicholas Poppino, Morrisville, NC (US); Eric E. Pettersen, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 25 days.

(21) Appl. No.: 15/923,446

(22) Filed: Mar. 16, 2018

(65) Prior Publication Data
US 2019/0286602 A1   Sep. 19, 2019

(51) Int. Cl.
*G06F 9/44*     (2018.01)
*G06F 13/40*    (2006.01)
*G06F 9/445*    (2018.01)
*G06F 13/42*    (2006.01)

(52) U.S. Cl.
CPC ...... *G06F 13/4081* (2013.01); *G06F 9/44505* (2013.01); *G06F 13/4282* (2013.01); *G06F 2213/0026* (2013.01)

(58) Field of Classification Search
CPC ............. G06F 13/4081; G06F 13/4282; G06F 9/44505; G06F 2213/0026
USPC ....................................................... 710/301
See application file for complete search history.

(56) References Cited

U.S. PATENT DOCUMENTS

| | | | | |
|---|---|---|---|---|
| 8,370,748 B1* | 2/2013 | Maity | ................. | H04L 41/0253 715/738 |
| 8,775,583 B1* | 7/2014 | Bennett, III | ............ | H04W 8/26 709/222 |
| 2012/0030346 A1* | 2/2012 | Fukuda | ............... | G06F 11/0709 709/224 |
| 2013/0096720 A1* | 4/2013 | Brey | ..................... | G06F 1/3206 700/276 |
| 2013/0282994 A1* | 10/2013 | Wires | ................... | G06F 3/0604 711/158 |

(Continued)

*Primary Examiner* — Christopher B Shin
(74) *Attorney, Agent, or Firm* — Jeffrey L. Streets

(57) ABSTRACT

An apparatus and a computer program product includes non-transitory computer readable storage media embodying program instructions. The program instructions are executable by a baseboard management controller (BMC) to receive a request to install a hardware component in a compute node, identify a current hardware configuration of the compute node, and identify a plurality of available locations within the compute node for installation of the requested component. Still further, the BMC may identify, for each available location, a historical performance database record that includes a performance score for a component installed in the same location as the available location, has the same component type as the requested component, and was collected from a compute node having the same hardware configuration as the current compute node. The BMC may select an available location that has the greatest performance score for the component, and generate output indicating the selected location for installation.

18 Claims, 8 Drawing Sheets

(56) References Cited

U.S. PATENT DOCUMENTS

| | | | |
|---|---|---|---|
| 2014/0022918 A1* | 1/2014 | Guo | H04W 48/20 370/252 |
| 2014/0032641 A1* | 1/2014 | Du | H04L 43/0817 709/203 |
| 2014/0244311 A1* | 8/2014 | Dawson | G06Q 40/08 705/4 |
| 2015/0324312 A1* | 11/2015 | Jacobson | G06F 13/4022 710/104 |
| 2016/0117461 A1* | 4/2016 | Yeh | G16H 40/40 705/2 |
| 2016/0359683 A1* | 12/2016 | Bartfai-Walcott | H04L 41/5009 |
| 2016/0380806 A1* | 12/2016 | Zhou | H04L 41/0677 709/224 |

\* cited by examiner

FIG. 5

Historical Performance Database

| Component Type and Specifications | Location within Compute Node | Performance Score | Compute Node Hardware Configuration | Component Populations (CPUs, memory modules, PCIe cards) and Specifications | Workload Type and Volume | Other Conditions (Thermal) |
|---|---|---|---|---|---|---|
| | | | | | | |
| | | | | | | |
| | | | | | | |
| | | | | | | |
| | | | | | | |
| | | | | | | |
| | | | | | | |

Installation Location Selection

Database Search Criteria (for each available location):
　　Component Type and Specifications
　　Compute Node Hardware Configuration
　　CPU Population and Specifications
　　Memory Population and Specifications
　　Workload Type and Volume
　　Other Conditions (Thermal)

100

| Available Location | Performance Score |
|---|---|
| 4 | 50% |
| 7 | 85% |
| 8 | 90% |
| 10 | 60% |
| 11 | 60% |
|  |  |

FIG. 6

SELECTION OF A LOCATION FOR INSTALLATION OF A HARDWARE COMPONENT IN A COMPUTE NODE USING HISTORICAL PERFORMANCE SCORES

BACKGROUND

The present disclosure relates to a system and method for selecting a location for installing a hardware component in a computing system.

BACKGROUND OF THE RELATED ART

A computing system, such as an individual compute node, may be designed so that various components may be added, replaced, or moved. In other words, these components are not permanently fixed in place. Such components are manually installed into an available slot, socket, bay or other receptacle of the computing system. A computing system that allows for components to be added can be expanded to have greater capacity, better performance, or additional functionality. A computing system that allows for components to be replaced can be upgraded to achieve improved capacity, performance or efficiency, or the computing system can be returned to service after replacing a component that has failed. Furthermore, a computing system that allows components to be moved around among various locations within the computing system provides the opportunity to improve operation of the computing system without requiring new components.

A typical motherboard of a compute node will have many components that are permanently fixed to a circuit board, such as by soldering. However, the same motherboard may also have at least one socket for installation of a central processing unit (CPU), several slots dedicated to receiving memory modules, and several expansion slots for receiving expansion modules. While the physical configuration and number of the socket(s) and slots on the motherboard may be fixed, a user may determine the number of components, and the hardware specifications for those components, that will be installed in the socket(s) and slots. For example, a user may install a dual in-line memory module (DIMM) in each of the available memory slots or in only a portion of the available memory slots. Furthermore, the user may also select the memory capacity of the DIMMs to be installed. Regarding the available expansion slots, the user may select the number and types of expansion modules, if any, that will be installed. Such expansion cards might include a graphics card, a solid state drive, or a network adapter. For example, a user may select between installing a 10 gigahertz (GHz; $10^9$ Hz) Ethernet card or a 100 GHz Ethernet card. In fact, in a cluster of computing systems, a server may have multiple Ethernet ports on multiple Ethernet cards to enable direct communication with multiple servers.

BRIEF SUMMARY

One embodiment provides a computer program product comprising non-transitory computer readable storage media having program instructions embodied therewith. The program instructions are executable by a baseboard management controller to receive a request to install a hardware component in connection with an identified compute node, wherein the hardware component is identified by a component type. The program instructions are further executable by the baseboard management controller to identify a current hardware configuration of the compute node, wherein the current hardware configuration identifies a plurality of hardware components already installed in the identified compute node, and identify a plurality of available locations within the compute node that are compatible with installation of the identified hardware component. Still further, the program instructions are executable by the baseboard management controller to identify, for each of the identified plurality of available locations, a record within a historical performance database that includes a performance score for a component installed in the same location as the available location and having the same component type as the requested hardware component, wherein the identified record further includes data identifying that the performance score was measured in a hardware configuration that is the same as the identified current hardware configuration of the compute node. The program instructions are also executable by the baseboard management controller to select a location from among the plurality of available locations that is associated with the greatest performance score for the identified component, and generate user output indicating the selected location where the component should be installed.

Another embodiment provides an apparatus comprising at least one storage device for storing program instructions and at least one processor for executing the program instructions. The program instructions are executable by the processor to receive a request to install a hardware component in connection with an identified compute node, wherein the hardware component is identified by a component type. The program instructions are further executable by the processor to identify a current hardware configuration of the compute node, wherein the current hardware configuration identifies a plurality of hardware components already installed in the identified compute node, and identify a plurality of available locations within the compute node that are compatible with installation of the identified hardware component. Still further, the program instructions are executable by the processor to identify, for each of the identified plurality of available locations, a record within a historical performance database that includes a performance score for a component installed in the same location as the available location and having the same component type as the requested hardware component, wherein the identified record further includes data identifying that the performance score was measured in a hardware configuration that is the same as the identified current hardware configuration of the compute node. The program instructions are also executable by the processor to select a location from among the plurality of available locations that is associated with the greatest performance score for the identified component, and generate user output indicating the selected location where the component should be installed.

Yet another embodiment provides a computer program product comprising non-transitory computer readable storage media having program instructions embodied therewith, wherein the program instructions are executable by a baseboard management controller to monitor a current hardware configuration of a computing system that includes the baseboard management controller, and monitor performance of one or more of hardware components in the current hardware configuration. The program instructions are further executable by the baseboard management controller to calculate a performance score for the given hardware component in response to a performance degradation of a given one of the hardware components, and store the performance score for the given hardware component in association with the current hardware configuration.

BRIEF DESCRIPTION OF THE SEVERAL VIEWS OF THE DRAWINGS

FIG. 5 is a table representing a data structure of a historical performance database.

FIG. 6 is a table representing the performance scores for each available location for installation of the component.

DETAILED DESCRIPTION

Figure 1:
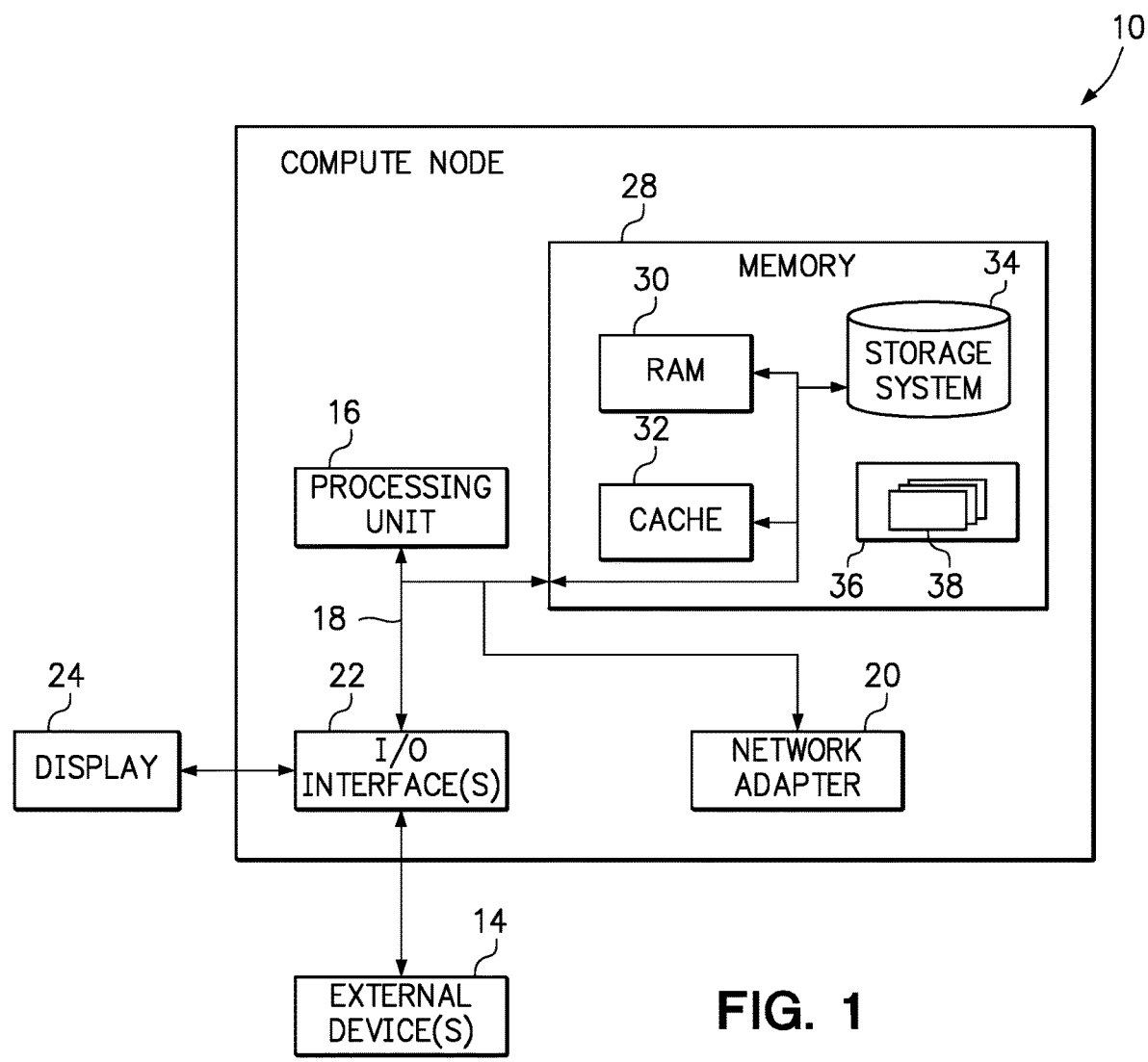
FIG. 1 is a diagram of a compute node

One embodiment provides a computer program product comprising non-transitory computer readable storage media having program instructions embodied therewith. The program instructions are executable by a baseboard management controller to receive a request to install a hardware component in connection with an identified compute node, wherein the hardware component is identified by a component type. The program instructions are further executable by the baseboard management controller to identify a current hardware configuration of the compute node, wherein the current hardware configuration identifies a plurality of hardware components already installed in the identified compute node, and identify a plurality of available locations within the compute node that are compatible with installation of the identified hardware component. Still further, the program instructions are executable by the baseboard management controller to identify, for each of the identified plurality of available locations, a record within a historical performance database that includes a performance score for a component installed in the same location as the available location and having the same component type as the requested hardware component, wherein the identified record further includes data identifying that the performance score was measured in a hardware configuration that is the same as the identified current hardware configuration of the compute node. The program instructions are also executable by the baseboard management controller to select a location from among the plurality of available locations that is associated with the greatest performance score for the identified component, and generate user output indicating the selected location where the component should be installed.

A baseboard management controller (BMC) is an out-of-band service processor in a compute node, such as a server. The BMC manages the interface between system management software and the hardware components of the compute node. The BMC communicates with various sensors in the compute node to monitor the operation of the compute node and may also exert some element of control over various components within the compute node. According to various embodiments, the BMC may attempt communication with components, such as PCIe expansion cards, memory modules and central processing units, which may be installed in various locations within the compute node. With access to data describing the hardware configuration of the compute node, the BMC can determine each available location for various types of components and may attempt communication with any component installed that may be installed at each location. Accordingly, in the absence of a response to the attempted communication or some other indication, the BMC may determine that a given location does not have a component installed. Such locations may be referred to as being "available". Alternatively, the BMC may receive a response from a component installed at the given location, thus indicating to the BMC that there is a component installed at that location. Furthermore, an installed component may report its type and capabilities to the BMC, which stores the information in a hardware configuration for the compute node. The BMC may be preloaded with a basic layout of the motherboard, but the inventory of installed components may be obtained through a series of such communication attempts to each of the available locations within the layout.

The compute node may be a stand-alone computer, but may also be compute node in a computing system that includes many compute nodes. For example, the compute node may be a server in a data center having a large number of servers. Where each compute node includes a baseboard management controller, the baseboard management controller of each compute node may be in communication with a management server. The management server may have a software interface with functionality used by an administrator to monitor the operating conditions of the servers in the data center and to control various operating parameters of the servers. In various embodiments, the management server may obtain and store historical performance records from the baseboard management controllers across many or all of the servers in the data center and may also provide historical performance records to the baseboard management controllers for use in selecting an available location in which to install a component. Furthermore, an individual baseboard management controller may communicate with the management software on the management server to gain access to additional historical performance data, search a historical performance database of records, or offload the entire selection of the installation location to the management server.

The hardware component that is the subject of the installation request may be any type of component that may be installed in the compute node. However, many of the components of a compute node are permanently fixed in the compute node, such as being soldered to the motherboard. Embodiments preferably include installation requests for components that are manufactured in a manner to facilitate replacement, upgrades, or expansions of the compute node. For example, a compute node may have multiple CPU sockets, multiple PCIe expansion slots and multiple memory module slots. However, the compute node may be operational even without each of these sockets and slots being fully populated with components. Furthermore, the compute node may be operational even without each of the components having a given level of performance, efficiency or rate of execution.

The hardware component that is the subject of the installation request is preferably identified by a component type. While such information may be explicitly provided, such as through a BMC webpage, it is also possible that such information may be partially or totally determined through direct communication with the BMC. For example, the compute node may receive the installation request in response to the user activating a button or switch on the compute node, which button or switch is preferably positioned adjacent an area where hardware components of the identified component type may be installed. Optionally, the BMC may confirm the component type after installation of the component by polling a PCIe expansion slot and, if there is a PCIe expansion card installed in the PCIe expansion slot, request that the PCIe expansion card identify itself to the BMC. A PCIe expansion card will preferably identify its own component type and at least one parameter characterizing the component, such as a bus width or execution rate.

In a specific example, the identified component may be a PCIe expansion card to be installed in the identified compute node and the available locations for installation are PCIe expansion slots, wherein the PCIe expansion card may be optionally further identified by a model number or a performance parameter. Furthermore, the PCIe expansion card may be identified as an Ethernet card and wherein the available locations are PCIe expansion slots. Still further, the identified component to be installed may be an Ethernet cable or connection, wherein the available locations are Ethernet ports, and wherein the selected location is the Ethernet port that will give the compute node the best input/output performance with another device over the Ethernet cable.

The request to install a hardware component in connection with an identified compute node may be received from a user through various devices. In one option, the request to install a component may be received as input from a button or switch manually activated by a user. Such button or switch may be a component of the compute node in which the user wants to install the component. Furthermore, the button or switch is preferably located proximate to an area of the compute node that includes a plurality of locations where components of the same component type may be installed. Accordingly, the user may locate and use the button or switch conveniently just prior to installing the component since the user may already have gained access to the area of the compute in which the component will be installed. For example, a compute node may have a button adjacent a group of PCIe slots that is dedicated to requesting installation of a PCIe device, a button adjacent a group of memory module slots that is dedicated to requesting installation of a memory module, and a button adjacent a group of central processing unit sockets that is dedicated to requesting installation of a CPU. Other configurations of the button or switches may also be suitable.

In a further option, the request to install a component may be received as input into a baseboard management controller webpage. According to this option, the user may interact with a graphical user interface to input the request and identify the component type of the hardware component to be installed. Optionally, the user may further identify the hardware component by providing a parameter characterizing the component, such as a capacity, rate of execution, or a component model number or stock keeping unit (SKU).

In yet another option, the request to install a component may be automatically generated in response to detecting one or more predetermined conditions within the compute node. For example, the program instructions may be further executable by the baseboard management controller to detect that a CPU installed in the compute node has failed, determine a hardware component that is dependent upon the failed CPU, and automatically generate a request to install the hardware component in another location within the compute node that is available, compatible and supported. Where the request to install the hardware component is automatically generated by the baseboard management controller, the user is preferably alerted to the need to install the hardware component by directing output to an indicator on the outside of the server or to the BMC webpage in a manner that will be seen by the administrator.

A current hardware configuration of the compute node identifies a plurality of hardware components that are already installed in the identified compute node. The current hardware configuration of the compute node may be identified or determined by the BMC. As part of the management function of the BMC, the BMC may poll (i.e., attempt communication) with each location in the compute node where a component may or may not be installed. More specifically, the BMC may poll each PCIe slot, each CPU socket and each memory module slot to determine whether a PCIe card, CPU or memory module is installed in the respective location. A server may have a hardware configuration that includes multiple PCIe slots, multiple CPU sockets or CPU module bays, and multiple memory modules. A server may also include other types of receptacles for selective installation and removal of other types of components, such as a graphics processing unit (GPU). Furthermore, the BMC may communicate with any installed components to gather more information about the installed component and its interaction with yet other components. Where an installed PCIe card is an Ethernet adapter with Ethernet ports, the BMC may request and receive information from the Ethernet adapter identifying whether an Ethernet cable in connected to each port. In one embodiment, the BMC may access stored hardware configuration data for the compute node, identify a plurality of locations described by the hardware configuration data as compatible with the component type of the identified component and as being supported by installed components upon which the identified component is dependent, and poll each of the identified locations to determine if a component is already installed in the location.

The BMC may identify a plurality of available locations within the compute node that are compatible with installation of the identified hardware component. If the BMC has previously obtained the hardware configuration of the compute node, then the available locations may be identified in a hardware inventory stored by the BMC. Alternatively, the baseboard management controller may need to take steps to identify the plurality of available locations within the compute node compatible with installation of the identified component. For example, the BMC may poll (i.e., attempt communication) with each location in the compute node where a component may or may not be installed. More specifically, the BMC may poll each PCIe slot, each CPU socket and each memory module slot to determine whether a PCIe card, CPU or memory module is installed in the respective location. Optionally, since the installation request identified the component type that is to be installed, the BMC may poll only those locations of the compute node that are compatible with installation of a component of the requested component type. Still further, the BMC may not poll certain locations that are not supported by other necessary components, such as not polling a certain PCIe slot if the PCIe slot is connected to a CPU socket that does not have an installed CPU. If the BMC does not detect an installed component in a given location, then that given location may be identified as being available. Each available location may then be evaluated as a candidate for receiving installation of the hardware component.

Compatibility of a hardware component with a given receptacle, such as a slot or socket) may be determined using various user-selected settings. In the example of PCIe expansion card and a PCIe slot, the compatibility may be determined as either a physical compatibility or an electronic compatibility. In one option, a PCIe slot may be determined to be compatible with a PCIe expansion card if the PCIe expansion card has a physical size that is less than or equal to the physical slot size of the PCIe slot. The physical slot size of the PCIe slot may be, for example, part of a data set provided to the BMC during manufacture of the compute node. In another option, a PCIe slot may be determined to be compatible with a PCIe expansion card if the PCIe expansion card has a physical size that is less than or equal to the physical slot size of the PCIe slot set out in the hardware configuration data and if the PCIe expansion card has a device bus width that is less than or equal to the bus width of the PCIe slot. In this latter option, the PCIe expansion card is determined to be incompatible if its device bus width is greater than the bus width of the PCIe slot such that the performance of the PCIe expansion card may be negatively impacted.

The BMC stores, or has access to, a historical performance database that includes performance records for various component types operating in various component locations of a compute node having a specific hardware configuration. Each performance record may, in one embodiment, store hardware component data and hardware configuration data. The hardware component data may include the component type and specifications, the location of the component within the compute node and the performance score for the component. The hardware configuration data may include a compute node hardware configuration, component populations and specifications (i.e, installed CPUs, installed memory modules and installed PCIe expansion cards), workload type and volume, and other conditions that may be affecting operations (such as thermal issues) at the time that the record is generated. The historical performance database is used to obtain a performance score for a given hardware component on the basis of historical records for compute nodes having a comparable hardware configuration to that of the compute node where a hardware component is to be installed. Each of the available locations for installation of the requested hardware component is given a performance score that is equal to the performance score in a historical record that was stored for a component installed in the same location as the available location and having the same component type as the requested hardware component, wherein the identified record further includes data identifying that the performance score was measured in a compute node having a hardware configuration that is the same as the identified current hardware configuration of the compute node in which the requested hardware component is to be installed. Optionally, the performance score may be taken from a historical performance record that most closely matches the component type, component specification, compute node hardware configuration, component populations and specifications, workload type and volume and other operating conditions.

The BMC may obtain or access one or more of the records from a local database or from a remote management node, which may be in communication with the baseboard management controllers in each of a plurality of compute nodes. Optionally, the BMCs of each compute node may share performance records, thus increasing the likelihood of finding performance records that match, or have greater similarity to, the compute node where the hardware component is to be installed for each of the available locations where the hardware component may be installed. In this manner, the BMC may make decisions about the best location for installation of a hardware component even if the particular BMC has not previously directly determined a performance score for the specific combination of component, location and system hardware configuration.

The performance score may be calculated in any manner reflecting the performance of a component. In one example, the performance score is a ratio of a measured value of a performance parameter for the component divided by a rated maximum value of the performance parameter for the component.

In a further embodiment, the hardware component may be further identified by at least one parameter characterizing the component, wherein the at least one parameter is selected from a capacity, a rate of execution or model number. To be useful, this parameter may also be stored in the records of the historical performance database. Accordingly, the performance score given to an available location for installation of a component may be the performance score in a historical record that not only matches (or has substantial similarity with) the component type, location, compute node hardware configuration, component populations and specifications, and workload type and volume, but that also matches (or has substantial similarity with) the at least one parameter characterizing the component. In this manner, a hardware component of a particular type and parameter value (say, a CPU with an execution rate of 2 GHz) will only be given a performance score on the basis of performance records that were stored for a CPU having an execution rate that is the same as, or substantially similar to, the 2 GHz execution rate. It should be recognized that including a parameter characterizing the hardware component, such as the execution rate of the component, may yield a performance score that is closer to the actual performance that the hardware component will yield during use, but may also require a larger database of performance records and increased data storage space for each of the records to accommodate the additional field (i.e., the execution rate of the component).

After identifying a plurality of available locations for installing the hardware component in the compute node and assigning a performance score based on a matching or substantially similar historical performance record, one of the available locations is selected from among the plurality of available locations on the basis of having the greatest performance score.

The baseboard management controller generates user output indicating the selected location where the component should be installed. The type of user output may be any output type, either presently known or developed in the future, that will communicate the selected location to the user. In one example of user output, the BMC may activate an indicator light that is located on or in the compute node directly physically adjacent the selected location where the component should be installed. Where a compute node includes four PCIe slots, such an indicator light may be located physically adjacent one end of each PCIe slot such that an activated indicator light is closer to the selection PCIe slot than to any other the other PCIe slots. Furthermore, if a PCIe expansion card is an Ethernet adapter with multiple Ethernet ports, the PCIe expansion card may similarly include an indicator light located physically adjacent each Ethernet port such that activating the indicator light closest to the selected Ethernet port will indicate that the user should connect an Ethernet cable to that port.

In another example of user output, the BMC may generate output to a graphical user interface describing the selected location wherein the component should be installed, wherein the graphical user interface is displayed by a device selected from a front panel diagnostic display on the compute node, a remote management computer, and a wireless mobile communication device. The description of the selected location may be textual or graphical, where the graphical output may any type of image ranging from a still diagram to an augmented reality display. In yet another example of user output, the BMC may generate an audible voice instruction describing the selected location where the component should be installed. Optionally, the indicator light may blink or produce some other output to indicate that an installation location is being identified. In this manner, the indicator light may be used for multiple purposes.

Although embodiments have been described in which a hardware component is being added to a compute node, embodiments may also include moving a currently installed component from one location in the compute node to another available location within the compute node. In this latter embodiments, the baseboard management controller may monitor performance of one or more of hardware components in the current hardware configuration and, in response to a performance degradation of a given one of the hardware components, calculate a performance score for the given hardware component. If the BMC can identify an available location that is associated with a greater performance score, then the BMC will automatically generate a request to install the hardware component in another available location within the compute node and generate user output indicating the current location of the given hardware component and the selected location where the given hardware component should be installed.

Another embodiment provides an apparatus comprising at least one storage device for storing program instructions and at least one processor for executing the program instructions. The program instructions are executable by the processor to receive a request to install a hardware component in connection with an identified compute node, wherein the hardware component is identified by a component type. The program instructions are further executable by the processor to identify a current hardware configuration of the compute node, wherein the current hardware configuration identifies a plurality of hardware components already installed in the identified compute node, and identify a plurality of available locations within the compute node that are compatible with installation of the identified hardware component. Still further, the program instructions are executable by the processor to identify, for each of the identified plurality of available locations, a record within a historical performance database that includes a performance score for a component installed in the same location as the available location and having the same component type as the requested hardware component, wherein the identified record further includes data identifying that the performance score was measured in a hardware configuration that is the same as the identified current hardware configuration of the compute node. The program instructions are also executable by the processor to select a location from among the plurality of available locations that is associated with the greatest performance score for the identified component, and generate user output indicating the selected location where the component should be installed.

Yet another embodiment provides a computer program product comprising non-transitory computer readable storage media having program instructions embodied therewith, wherein the program instructions are executable by a baseboard management controller to monitor a current hardware configuration of a computing system that includes the baseboard management controller, and monitor performance of one or more of hardware components in the current hardware configuration. The program instructions are further executable by the baseboard management controller to calculate a performance score for the given hardware component in response to a performance degradation of a given one of the hardware components, and store the performance score for the given hardware component in association with the current hardware configuration.

The performance score and the associated current hardware configuration may be stored in a record of a database of historical performance records. Each record may store the performance score of the identified component in association with the hardware configuration and application load of the compute node at that time performance data was obtained to calculate the performance score. The historical performance database may be stored by the BMC on the compute node or stored by a management server that receives the historical performance records from the BMC and other BMCs in communication with the management server. One example of a performance score may be calculated as an actual execution rate for the component divided by a maximum execution rate for the component. The "score" is calculated when degradation of performance is detected, and is stored in a database for later use when searching the database to identify an optimal location to install a device. For example, a record within the database may indicate a score for an Ethernet card was 50/100 based on a 50% degradation when installed in a certain location of a computing system. The record stores this performance score along with the identity of the hardware component, the installed location and various other hardware configuration information. Optionally, a record may further include hardware specifications for various components in the computing system and/or operating conditions at the time that the hardware component performance data was obtained. The calculation of a score helps populate the database, and the database is used at some later point in time to determine where to install the component, such as a PCIe expansion card or an Ethernet cable.

Embodiments may produce a performance score that is ascending or descending with improving performance of the component or the computing system that includes the possible location for the component. Where the score is ascending (descending) with improving performance, the preferred location for the component will have the highest (lowest) score among scores determined for each of a plurality of possible locations. Accordingly, the location that is "best", "preferred" or "optimal" may have either a highest score or a lowest score depending upon whether the location score is ascending or descending.

EXAMPLE

In a hypothetical configuration of a compute node ("Configuration A"), a 100 G Ethernet card is plugged into a CPU that is installed in a location downstream from a NVMe/SSD hard drive (or some other subsystem) that generates enough heat to warm the cooling airflow before it reaches the CPU. Accordingly, the warm airflow and the load on the CPU may cause the CPU temperature to rise and the CPU performance to degrade or be throttled. When the CPU performance (execution rate) is degraded or throttled as a result of an elevated temperature, the performance of the 100 G Ethernet may also be degraded. Under the described hardware configuration (layout of the components) of the compute node and operating conditions (load no the NVMe/SSD hard drive and load on the CPU), the performance of the 100 G Ethernet card might be increased by moving the 100 G Ethernet card to a slot that is connected to a CPU that is not being pre-heated.

In this Example, the compute node has a baseboard management controller (BMC) that monitors various operating conditions of the compute node. The BMC executes program instructions to determine a performance score for the 100 G Ethernet card and store that performance score in association with certain configuration details in memory accessible to the BMC. The performance score for the 100 G Ethernet card may be calculated by identifying the impacted subsystem and querying the subsystem to see what percentage of degradation it is experiencing. In the present example, if the 100 G Ethernet card is only performing at 50%, then the performance score for the 100 G Ethernet card may be 50/100. Every time a component experiences performance degradation, the BMC may store a record identifying the impacted subsystem (100 G Ethernet card), the performance score (50/100), the system configuration (100 G Ethernet card plugged into a CPU downstream from an NVMe/SSD hard drive), and optionally the operating conditions (extent of load on the NVMe/SSD hard drive and load on the CPU).

FIG. 1 is a diagram of an individual computing node 10. The computing node 10 is a non-limiting example of a computing node suitable for use in cloud computing. The computing node 10 may be a server having any form factor, configuration or functionality. For example, the computing node may be a blade server that operates in a blade server chassis along with other blade servers that share certain infrastructure and support modules.

The computing node 10 includes at least one processor or processing unit 16, system memory 28, a network adapter 20, an input/output interface 22, and a bus 18 that enables the processing unit to communicate with the system memory, the network adapter and the input/output interface. The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 28 may include any computer readable storage media, such as random access memory (RAM) 30, cache memory 32, and combinations thereof. The computing system 10 may further include any other removable or non-removable, and volatile or non-volatile computer readable storage media. By way of example only, a data storage system 34 may include non-removable, non-volatile magnetic media (such as a "hard drive") or solid state media (such as a "flash memory" or other "solid state drive"). Furthermore, the memory 28 may include a magnetic disk drive for reading from or writing to a removable magnetic disk (e.g., a "floppy disk") or an optical disk drive for reading from or writing to a removable non-volatile optical disk (e.g., a CD-ROM, DVD-ROM or other optical media). Optionally, each memory device may be connected to the bus 18 by one or more data media interfaces. The memory 28 may store at least one computer program product including program instructions executable by the processing unit 16 to perform an embodiment described herein. For example, the memory 28 may store one or more application 36, such as an operating system, hypervisor and/or user application, having a set of functions or program modules 38.

Optionally, the computing node 10 may also communicate with one or more external devices 14, such as a keyboard, a pointing device, and/or a display 24. Furthermore, the computing node 10 may communicate with one or more other computing nodes or network devices (not shown) using the network adapter 20, which is connected to the processing unit 16 via the system bus 18. It should be understood that other hardware and/or software components, not shown, may be used in conjunction with the computing node 10.

Figure 2:
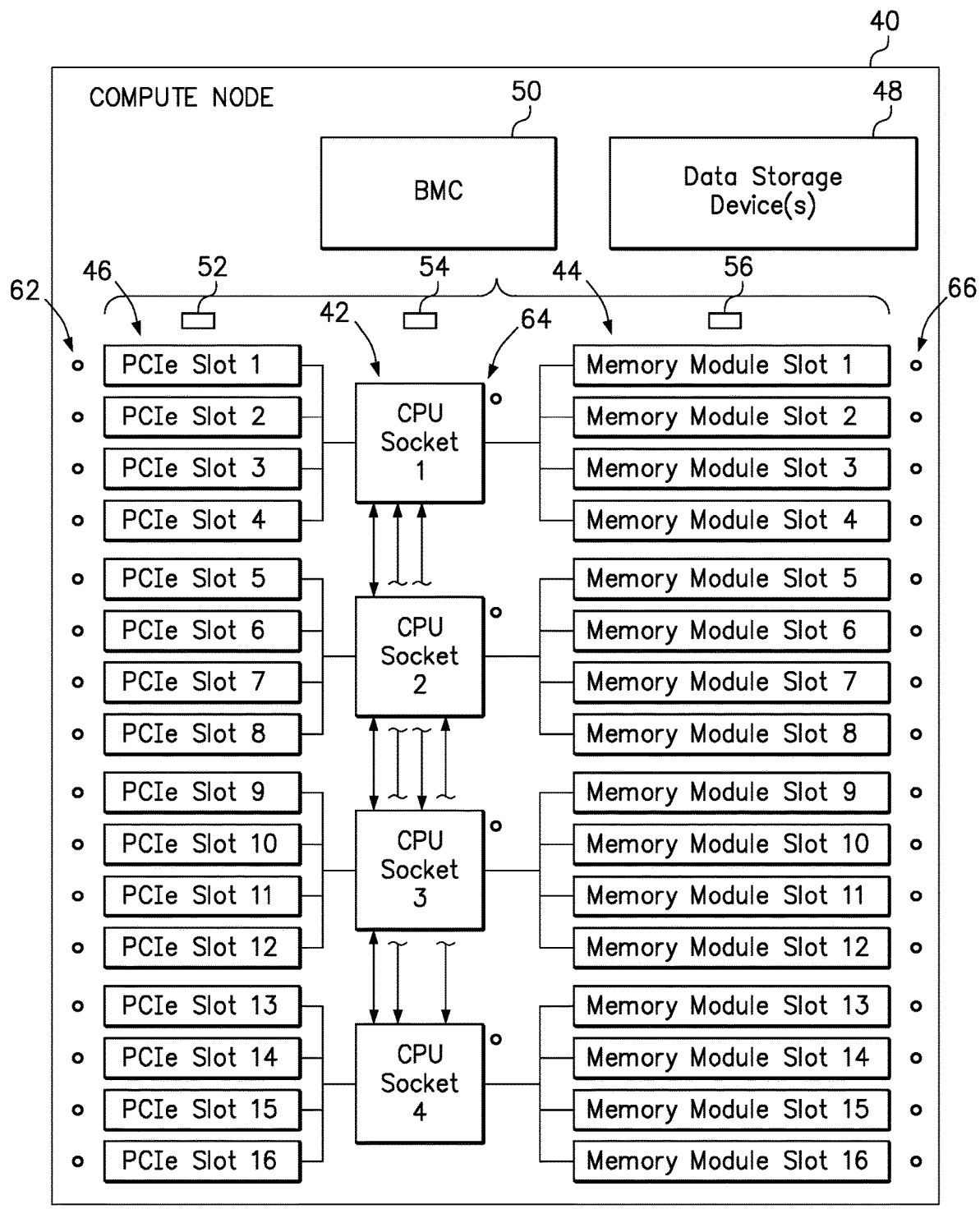
FIG. 2 is a diagram of a baseboard management controller

FIG. 2 is a diagram of a compute node 40 have a hardware configuration that include multiple locations for user installation of hardware components. The compute node 40 includes four CPU sockets 42 (CPU Sockets 1-4) in which a CPU may be installed, sixteen memory module slots 44 (Memory Module Slots 1-16) in which a memory module may be installed, and sixteen PCIe slots 46 (PCIe Slots 1-16) in which a PCIe expansion card may be installed. The compute node 40 may further include one or more data storage devices 48, as well as other components that are not shown. Furthermore, the compute node 40 includes a baseboard management controller (BMC) 50 that is able to monitor any hardware components that are installed in the four CPU sockets 42, the sixteen memory module slots 44, and the sixteen PCIe slots 46.

The hardware configuration illustrated in FIG. 2 is just one of many possible hardware configurations for a multi-processor compute node. However, in this non-limiting example, the four CPU sockets 42 are disposed down the middle of a motherboard with the sixteen memory module slots 44 on one side of the CPU sockets and with the sixteen PCIe slots 46 on another side of the CPU sockets. Many other hardware configurations are possible. However, regardless of the specific hardware configuration, the BMC 50 is coupled to each of the CPU sockets 42, each of the memory module slots 44, and each of the PCIe slots 46, such that the BMC 50 may determine a current hardware inventory or configuration of the compute node 40. More specifically, the BMC 50 may send a communication to each individual socket or slot. If the BMC 50 receives a reply to a message sent to a particular location within the compute node, such reply will indicate the presence of an installed component in the particular location and may also provide an additional parameter characterizing the installed component. The BMC will then store information about the installed component in a compute node hardware configuration file. However, if the BMC 50 does not receive a reply to a message sent to a particular location within the compute node, the BMC may assume that there is no hardware component installed in the particular location and store this information (i.e., the absence of an installed component) in the compute node hardware configuration file.

The compute node 40 further includes three installation request buttons 52, 54, 56 and three sets of location indicator lights 62, 64, 66. In accordance with various embodiments, the three request buttons include a CPU installation request button 54 aligned with the CPU sockets 42, a memory module installation request button 56 aligned with the memory module slots 44, and a PCIe expansion card request button 52 aligned with the PCIe slots 46. The location of the buttons is preferably intuitive or suggestive of the component type that the user wants to install. Furthermore, the location indicator lights include a CPU socket location indicator light 64 immediately adjacent each of the CPU sockets 42, a memory module slot location indicator light 66 immediately adjacent each of the memory module slots 44, and a PCIe slot location indicator light 62 immediately adjacent each of the PCIe slots 46. As used herein, the term "immediately adjacent" means that the location indicator light has a proximity to a socket or slot that closer to the associated socket or slot than to any other socket or slot, and has a location that clearly identifies which socket or slot is being indicated as the selected location for installation of a compatible hardware component.

The principles and teachings described herein may be equally applied to compute nodes of any form factor regardless of the nature of the receptacles in which the hardware components may be received. For example, a compute node may include a plurality of CPU module bays for receiving CPU modules, rather than having CPU sockets for receiving a CPU, without departing from the scope of the embodiments.

Figure 3:
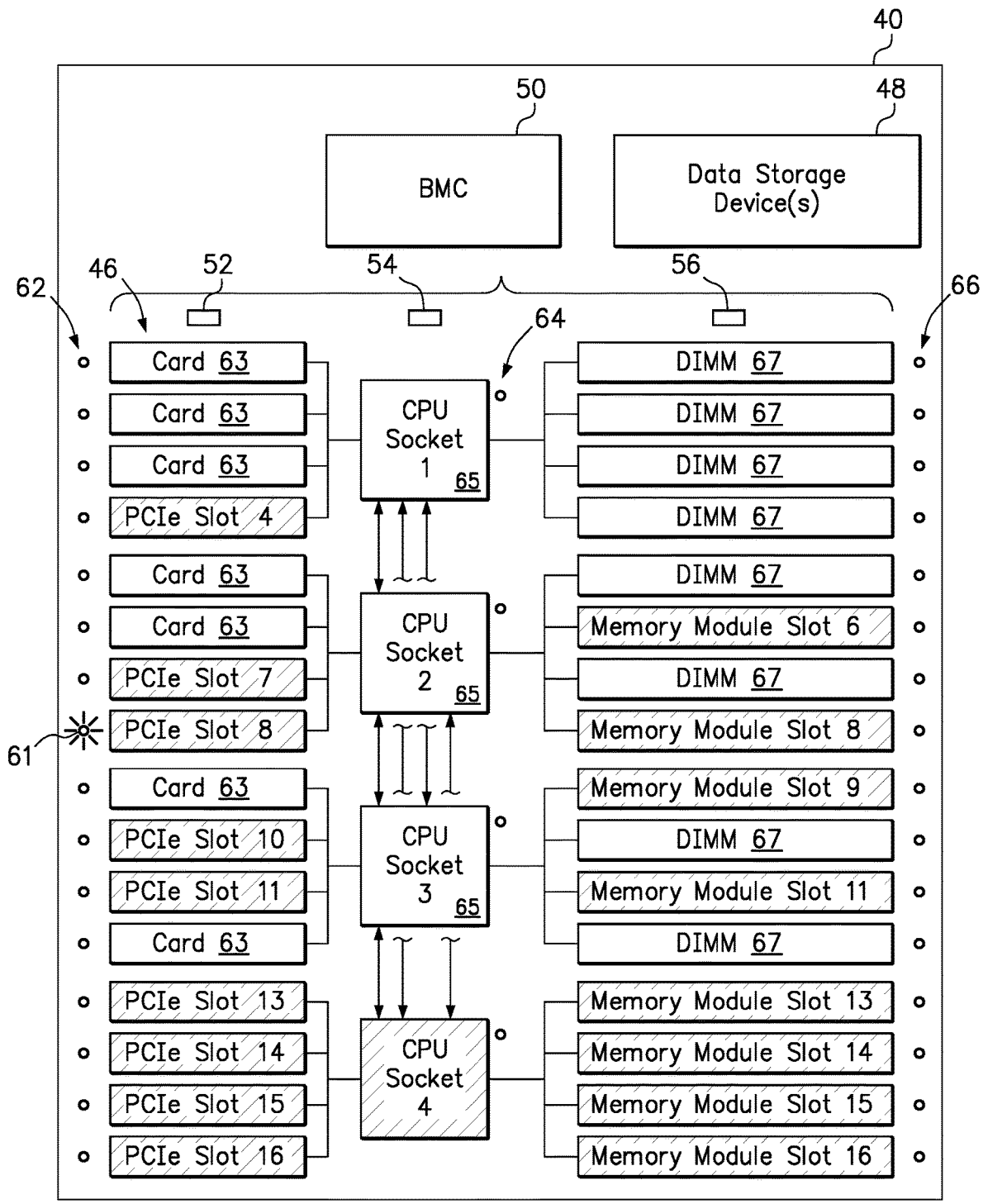
FIG. 3 is a diagram of a compute node hardware configuration.

FIG. 3 is a diagram of a current hardware configuration of the compute node 40 identifying locations that are available for installation of a further hardware component. The compute node 40 is the same compute node shown in FIG. 2, except that a hardware component has been installed in many of the sockets and slots shown in FIG. 2. For example, PCIe expansion cards (individually, "Card") 63 have been installed in PCIe slots 1-3, 5-6, 9 and 12; CPUs 65 have been installed in CPU sockets 1-3; and dual in-line memory modules (DIMM) 67 have been installed in the memory module slots 1-5, 7, 10 and 12. Accordingly, the BMC 50 is able to determine the current hardware configuration of the compute node 40, including some identification of each hardware component 63, 65, 67 that has been installed. Furthermore, the BMC 50 may identify each of the available locations (shown with diagonal lines) for installation of a further hardware component. It is these available locations that the BMC will consider recommending as an installation location for a hardware component in response to receiving an installation request.

In one example, a user desiring to install a PCIe expansion card in the compute node 40 may press the PCIe expansion card request button 52 that is aligned with the PCIe slots 46. The BMC 50 may then identify which of the PCIe slots 46 are available locations for installation of a PCIe expansion card, and obtain a performance score for each of those available locations. Then, the BMC inform the user of the available location with the best performance score. In this example, the BMC may activate the one of the indicator lights 62 that is immediately adjacent the selection PCIe slot 46. If PCIe Slot 8 was selected for installation of the PCIe expansion card, then the BMC 50 would activate the indicator light 61 that is immediately adjacent PCIe Slot 8.

In various embodiments, the BMC may eliminate one or more of the "available locations" from consideration based on certain preliminary conditions. For example, although PCIe slots 13-16 are technically available since they are not occupied by a PCIe expansion card, the PCIe slots 13-16 are unsupported by a CPU since CPU socket 4 is also available. Furthermore, even in a CPU were installed in CPU socket 4, that CPU might be substantially ineffective since memory module slots 13-16 are also available. Accordingly, the BMC may impose certain restrictions or conditions when determining whether a socket or slot is to be considered an "available location" that is worthy of the computational workload of determining a performance score for each available location.

Figure 4:
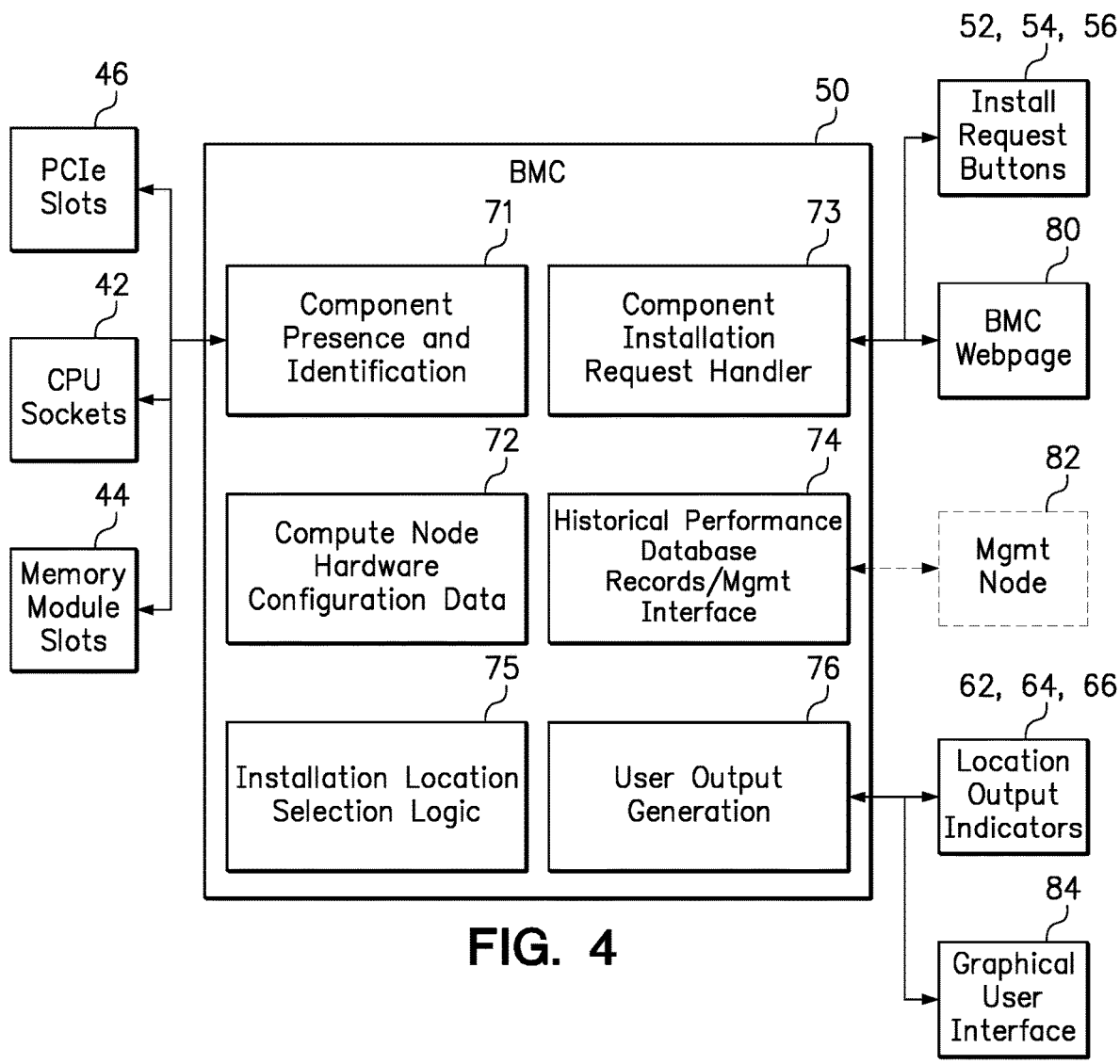
FIG. 4 is a diagram of a current hardware configuration of a compute node identifying locations that are available for installation of a component.

FIG. 4 is a diagram of a baseboard management controller (BMC) 50 according to one embodiment. The BMC 50 may include many program instructions or logic modules not represented in FIG. 4. However, various logic and data modules of the BMC 50 that support the present embodiments are shown and discussed herein.

The BMC 50 includes Component Presence and Identification logic 71, which support the BMC communication with each hardware component installed in the compute node. For example, the BMC may send a message or signal to each of the PCIe slots 46, each of the CPU sockets 42 and each of the memory module slots 44, and process any reply messages indicating that a hardware component is installed in the corresponding location. Conversely, the BMC may use the same reply message, or lack of reply messages, to identify each available location in the compute node. The BMC 50 may store information collected about the hardware configuration in Compute Node Hardware Configuration Data 72. Furthermore, the Compute Node Hardware Configuration Data 72 could also include data provided by the manufacturer or obtained from a management node identifying one or more aspect of the hardware configuration of the compute node.

The BMC 50 may further include a Component Installation Request Handler 73 that receives a component installation request from a user via activation of an installation request button 52, 54, 56 or user input through a BMC webpage 80. The installation request identifies the hardware component type, either by the specific button activated by the user or by the input provided to the BMC webpage by the user.

The BMC 50 may then use the Installation Location Selection Logic 75 to select a location for installation of the hardware component of the type in the installation request. For example, the Installation Location Selection Logic 75 may access the Compute Node Hardware Configuration Data 72 to identify the available locations and may access a Historical Performance Database Records/Management Interface 74 in order to obtain a performance score for each of the available locations. The Historical Performance Database Records/Management Interface 74 may obtain the performance scores from historical performance records stored on the compute node and directly accessible to the BMC and/or may obtain the performance scores from historical performance records stored on an optional management node 82. More specifically, the Installation Location Selection Logic 75 may, for each of the available locations, search the accessible historical performance records to identify one or more records that provide a performance score of a matching or substantially similar hardware configuration as the one being proposed by a hypothetical installation of the requested hardware component in each of the available locations, respectively. Accordingly, the database may be searched multiple times, each search looking for a record that include the current hardware configuration of the compute node as well as the requested hardware component in one of the available locations.

After obtaining a performance score for each of the available locations, the location with the best performance score is selected for receiving installation of the hardware component. Accordingly, the BMC 50 then uses the User Output Generation module 76 to send an output signal to a location output indicator 62, 64, 66 that is immediately adjacent the selection location or send an output message to a graphical user interface 84 that outputs text, graphics or audio instructing the user where to install the hardware component.

FIG. 5 is a table 90 providing a non-limiting example a possible data structure of a historical performance database.

At any given point in time, the BMC captures and stores compute node configuration and performance information in a single record of the historical performance database. Here, the database is illustrated as a table, but the same data may be stored in other data structures. As illustrated, a historical performance record may comprise a single horizontal row of the table. Each record (row) may include data stored in separate fields, each field represented by a vertical column of the table. Over time, the historical performance database collects many records representing a wide range of possible configurations of the compute node and a resulting performance of the compute node under various conditions. The database is utilized to later predict the performance of a hardware component at various locations, with various configurations, and under various conditions.

In one embodiment, each record will include data for each field identified by the column headers. Accordingly, in this example, a complete record may include (1) component type and specifications of a hardware component, (2) location with the compute node of the hardware component, (3) a performance score for the component, (4) a compute node hardware configuration (i.e., general layout; see FIG. 2), (5) information describing the component populations and specifications (for installed CPUs, memory modules and PCIe cards; see FIG. 3), (6) workload type and volume being performed by the compute node, and (7) any other significant conditions (such as a high cooling air inlet temperature).

The individual records of the historical performance database may be stored at any time, such as periodically or in response to some one or more events. In one embodiment, a record is stored in response to detecting degradation of performance for a particular component of the compute node. In any manner, the historical performance database is later used in response to receiving an installation request from a user. The historical performance database is then searched to find, for each available location, a record that matches or most closely corresponds to the current hardware configuration of the compute node if the requested hardware component were to be installed in that location. The performance score in such a record is then assigned to the available location. The performance score for any available location for the component can be compared with the performance score for each of the other available locations for the component. The available location with the best performance score (PCIe Slot 8) is selected for installation of the hardware component.

FIG. 6 is a table 100 representing the performance scores for each available location for installation of the hardware component. In reference to FIG. 3, the available locations (i.e., a PCIe slot) for installing a PCIe expansion card may be determined by the BMC to be PCIe Slots 4, 7-8 and 10-11. Note that PCIe Slots 13-16 are not considered to be available since they are unsupported by a CPU.

The historical performance database 90 may then be searched using the database search criteria identified at the top of FIG. 6. Specifically, the database 90 may be searched for each of the five available locations for installing the PCIe expansion card that is the subject of an installation request. In other words, each search assumes that the PCIe expansion card is actually installed in one of the available locations and searches for a record having the corresponding hardware configuration. The performance score in a record that matches, or most closely matches, the search criteria will be assigned to the available location as being representative of how the hardware component has previously performed under a similar compute node hardware configuration and under similar operating conditions.

Figure 7:
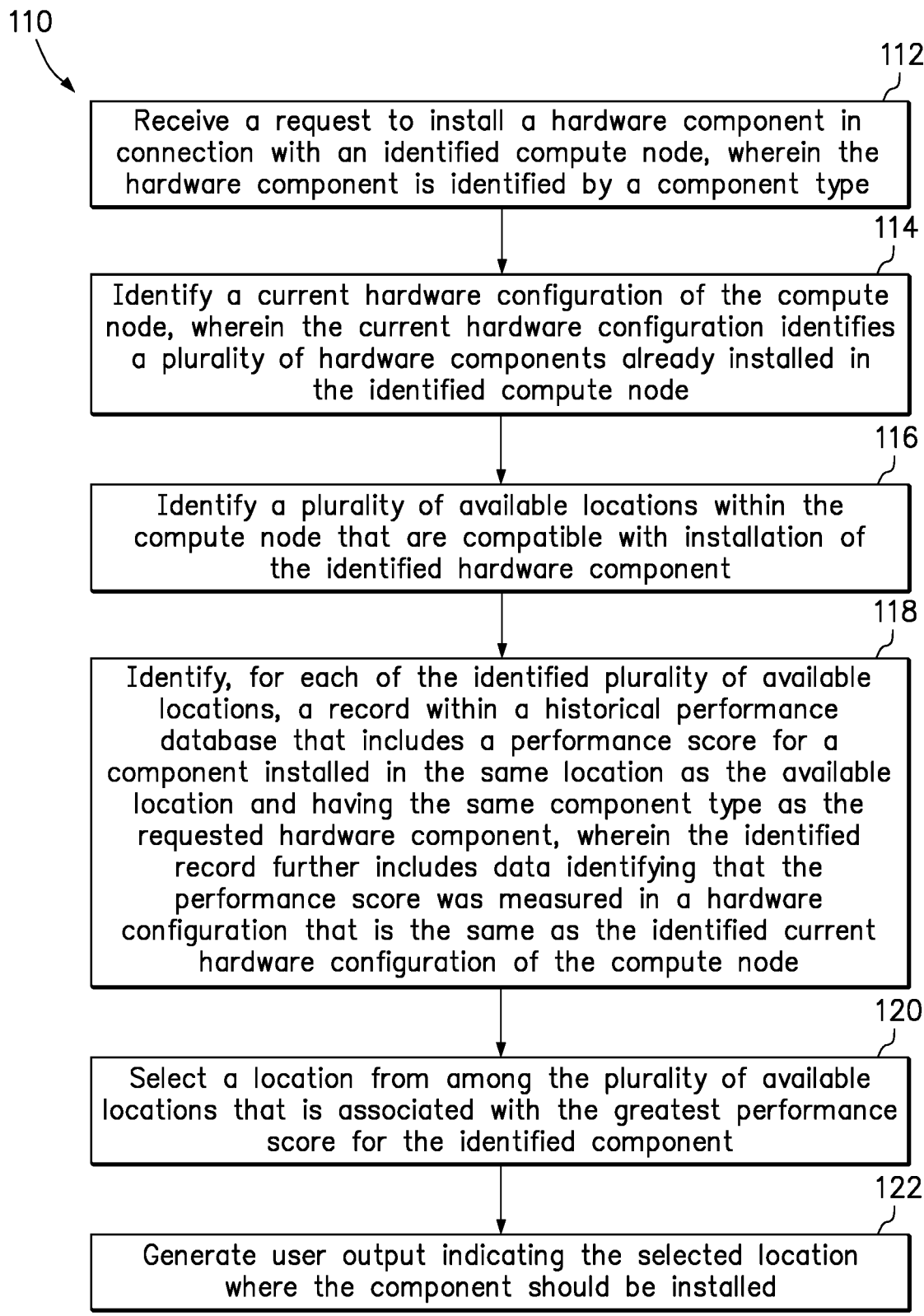
FIG. 7 is a flowchart of a method according to one embodiment.

FIG. 7 is a flowchart of a method 110 according to one embodiment. In step 112, the method receives a request to install a hardware component in connection with an identified compute node, wherein the hardware component is identified by a component type. In step 114, the method identifies a current hardware configuration of the compute node, wherein the current hardware configuration identifies a plurality of hardware components already installed in the identified compute node. In step 116, the method identified a plurality of available locations within the compute node that are compatible with installation of the identified hardware component. In step 118, the method identifies, for each of the identified plurality of available locations, a record within a historical performance database that includes a performance score for a component installed in the same location as the available location and having the same component type as the requested hardware component, wherein the identified record further includes data identifying that the performance score was measured in a hardware configuration that is the same as the identified current hardware configuration of the compute node. In step 120, the method selects a location from among the plurality of available locations that is associated with the greatest performance score for the identified component. In step 122, the method generates user output indicating the selected location where the component should be installed.

Figure 8:
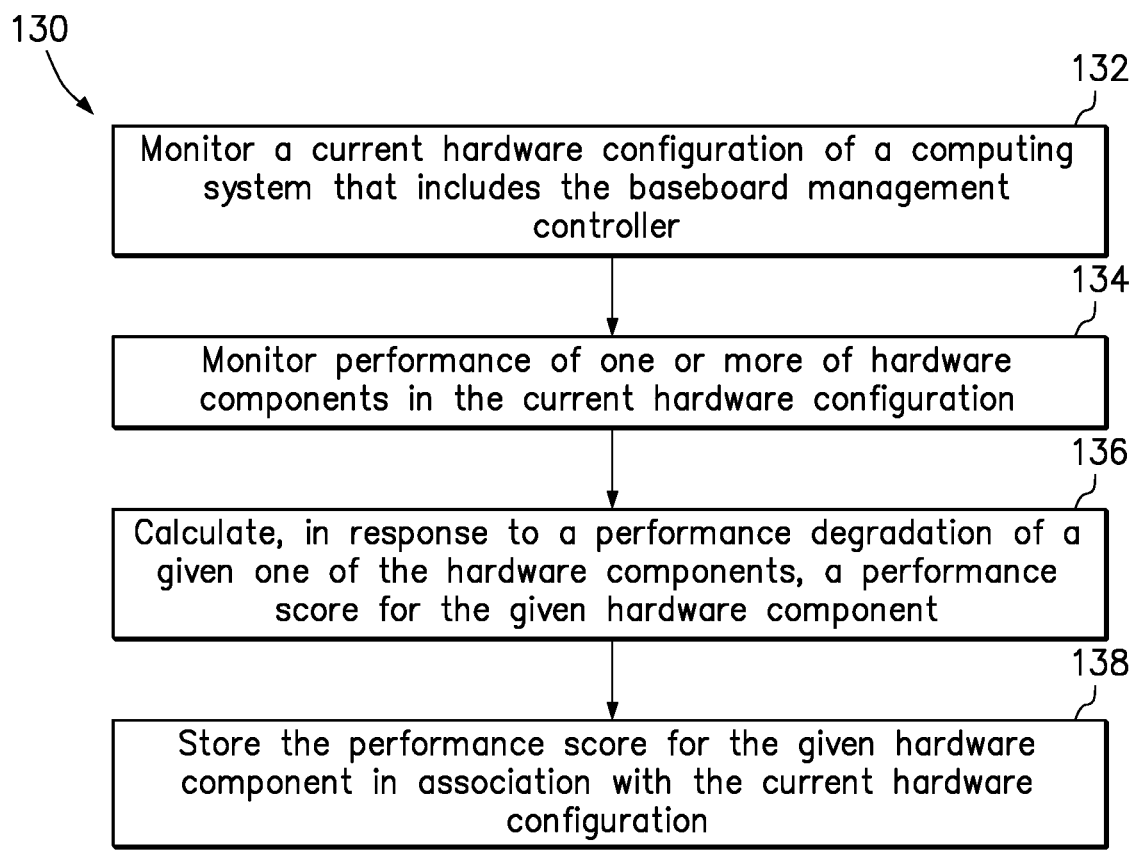
FIG. 8 is a flowchart of a method according to one embodiment.

FIG. 8 is a flowchart of a method 130 according to one embodiment. In step 132, the method monitors a current hardware configuration of a computing system that includes the baseboard management controller. In step 134, the method monitors performance of one or more of hardware components in the current hardware configuration. In step 136, the method calculates, in response to a performance degradation of a given one of the hardware components, a performance score for the given hardware component. In step 138, the method stores the performance score for the given hardware component in association with the current hardware configuration.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising non-transitory computer readable storage media having program instructions embodied therewith, the program instructions executable by a baseboard management controller to:

receive a request to install a hardware component in connection with an identified compute node, wherein the hardware component is identified by a component type;

identify a current hardware configuration of the compute node, wherein the current hardware configuration identifies a plurality of hardware components already installed in the identified compute node;

identify a plurality of available locations within the compute node that are compatible with installation of the identified hardware component;

identify, for each of the identified plurality of available locations, a record within a historical performance database that includes a performance score for a component installed in the same location as the available location and having the same component type as the requested hardware component, wherein the identified record further includes data identifying that the performance score was measured in a hardware configuration that is the same as the identified current hardware configuration of the compute node;

select a location from among the plurality of available locations that is associated with the greatest performance score for the identified component; and generate user output indicating the selected location where the component should be installed.

2. The computer program product of claim 1, wherein the request to install a component is received as input from a button or switch manually activated by a user, wherein the button or switch is a component of the compute node and is located proximate to the plurality of available locations within the compute node.

3. The computer program product of claim 1, wherein the request to install a component is received as input into a baseboard management controller webpage.

4. The computer program product of claim 1, wherein the program instructions executable by the baseboard management controller to identify the plurality of available locations within the compute node compatible with installation of the identified component includes program instructions executable by the baseboard management controller to:
   access stored hardware configuration data for the compute node;
   identify a plurality of locations described by the hardware configuration data as compatible with the component type of the identified component and as being supported by installed components upon which the identified component is dependent; and
   poll each of the identified locations to determine if a component is already installed in the location.

5. The computer program product of claim 4, wherein the identified component is a PCIe expansion card to be installed in the identified compute node, and wherein a PCIe slot described by the hardware configuration data is determined to be compatible with the PCIe expansion card if the PCIe expansion card has a physical size that is less than or equal to the physical slot size of the PCIe slot set out in the hardware configuration data.

6. The computer program product of claim 4, wherein the identified component is a PCIe expansion card to be installed in the identified compute node, and wherein a PCIe slot described by the hardware configuration data is determined to be compatible with the PCIe expansion card if the PCIe expansion card has a physical size that is less than or equal to the physical slot size of the PCIe slot set out in the hardware configuration data and if the PCIe expansion card has a device bus width that is less than or equal to the bus width of the PCIe slot.

7. The computer program product of claim 1, wherein the performance score is a ratio of a measured value of a performance parameter for the component divided by a rated maximum value of the performance parameter for the component.

8. The computer program product of claim 1, wherein the identified component is a PCIe expansion card to be installed in the identified compute node, wherein the PCIe expansion card is identified by a model number or a performance parameter.

9. The computer program product of claim 8, wherein the PCIe expansion card is an Ethernet card, and wherein the available locations are PCIe expansion slots.

10. The computer program product of claim 1, wherein the identified component is an Ethernet cable, wherein the available locations are Ethernet ports, and wherein the selected location is the Ethernet port that will give the compute node the best input/output performance with another device over the Ethernet cable.

11. The computer program product of claim 1, wherein the program instructions are further executable by the baseboard management controller to:
   obtain one or more of the records from a management node that is in communication with baseboard management controllers in each of a plurality of compute nodes.

12. The computer program product of claim 1, wherein the program instructions executable by the baseboard management controller to generate user output indicating the selected location where the component should be installed includes program instructions executable by the baseboard management controller to:
   activate an indicator light that is located on the compute node directly physically adjacent the selected location where the component should be installed.

13. The computer program product of claim 1, wherein the program instructions executable by the baseboard management controller to generate user output indicating the selected location where the component should be installed includes program instructions executable by the baseboard management controller to:
   generate output to a graphical user interface describing the selected location wherein the component should be installed, wherein the graphical user interface is displayed by a device selected from a front panel diagnostic display on the compute node, a remote management computer, and a wireless mobile communication device.

14. The computer program product of claim 1, wherein the hardware component is further identified by at least one parameter characterizing the component, and wherein the at least one parameter characterizing the component is selected from the group consisting of a capacity and a rate of execution.

15. The computer program product of claim 1, wherein the program instructions are further executable by the baseboard management controller to identify an application load currently running on the compute node, and wherein the identified record further includes data identifying an application load that is the same as the identified current application load running on the compute node.

16. The computer program product of claim 4, wherein the program instructions are further executable by the baseboard management controller to:
   detect that a CPU installed in the compute node has failed;
   determine a hardware component that is dependent upon the failed CPU; and
   automatically generate a request to install the hardware component in another location within the compute node that is available, compatible and supported.

17. The computer program product of claim 1, wherein the program instructions are further executable by the baseboard management controller to:
   monitor performance of one or more of hardware components in the current hardware configuration;
   calculate, in response to a performance degradation of a given one of the hardware components, a performance score for the given hardware component; and
   automatically generate a request to install the hardware component in another available location within the compute node; and
   generate user output indicating the current location of the given hardware component that should be installed in the selected location.

18. An apparatus, comprising:
   at least one storage device for storing program instructions; and
   at least one processor for processing the program instructions to:

receive a request to install a hardware component in connection with an identified compute node, wherein the component is identified by a component type;

identify a plurality of available locations within the compute node compatible with installation of the identified component;

identify a current hardware configuration of the compute node;

for each of the identified plurality of available locations, identify a record within a historical performance database that includes a performance score for a component having the same component type in the available location, wherein the identified record further includes data identifying a hardware configuration that is the same as the identified current hardware configuration of the compute node;

select a location from among the plurality of available locations that is associated with the greatest performance score for the identified component; and generate user output indicating the selected location where the component should be installed.

\* \* \* \* \*